May 2, 1933.    W. V. CORNISH    1,907,345
FRICTION ROLLER FOR CABLE GUIDES
Filed Feb. 9, 1931

WITNESS

INVENTOR
William V. Cornish,
BY
ATTORNEY

Patented May 2, 1933

1,907,345

UNITED STATES PATENT OFFICE

WILLIAM V. CORNISH, OF CALUMET, MICHIGAN

FRICTION ROLLER FOR CABLE GUIDES

Application filed February 9, 1931. Serial No. 514,689.

My invention relates to friction rollers for cable guides, and consists in the constructions, arrangements and combinations herein described and claimed.

An object of the invention is to provide rotary supports for cables or the like, which will efficiently resist abrasion and also prevent abrasion of the cables moving thereover.

Another object of the invention is to provide a plurality of rotatable supports which may be arranged in axial alignment for securement as a unit and which may be at minimum expense.

A further object of the invention is the provision of a roller which will normally support and guide a moving cable, while yet permitting considerable movement of the latter in a direction axially with the roller.

A still further object of the invention is to provide a new hub construction in which the bushing thereof will be properly centered.

Additional objects, advantages and features of the invention will be apparent from the following description considered in conjunction with the accompanying drawing wherein.

Figure 1:
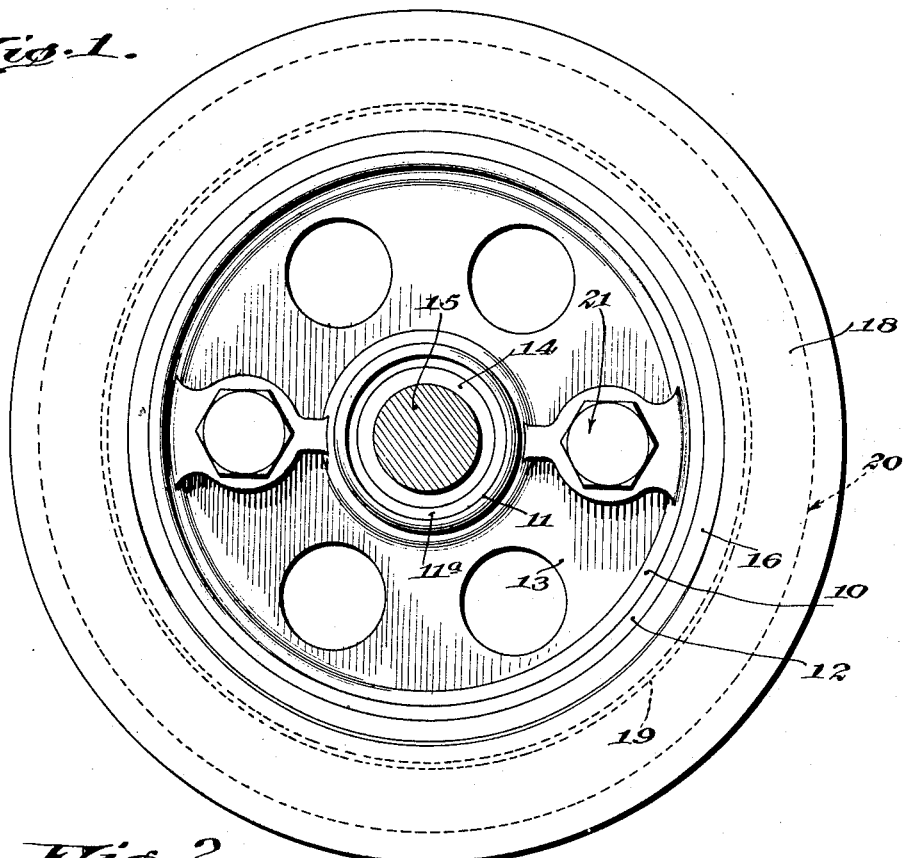
Figure 1 is a plan view of a roller constructed in accordance with my invention.

The hub 11 has an annular recess 11a formed upon one end, while the opposite end of the hub has an annular rim 11b. A bushing 14 is positioned within the hub 11 one end thereof resting flush with the recess 11a and the other end of the bushing stops flush with the rim 11b. A wheel thus bushed may be revolubly mounted upon the shaft 15.

A metallic ring 16 is provided, the outer periphery of which is roughened as at 17, to receive and hold a rubber facing 18 when vulcanized thereto. The facing 18 is in the form of a ring of rubber having a fabric or fiber core 19 incorporated in the body thereof, this core extending circumferentially of the facing, and limits the elasticity of the facing. The core may be incorporated in the facing in any manner well understood in the art, but preferably includes a vulcanization process, in order to present a compact and unitary structure.

The diameter of the ring 16 is such that it will be received upon the rim 12 by a press fit, and thus effectively unite the rim to the wheel.

In the outer periphery of the facing 18, a circumscribing groove 20 is provided, which is of ample depth to receive a cable to be guided.

The wheel 10 is freely revoluble upon the shaft 15 and also has unrestricted axial movement to accommodate varying movements of a cable.

In the use of my device, the cable to be supported is disposed in the groove 20 of the roller and due to the gripping quality of the facing 18, the wheel is caused to rotate with movement of the cable, thus supporting the cable throughout its movement. Also, it should be noted that the wheel 10 will partake of any lateral movements which may occur in movement of the cable.

Figure 2:
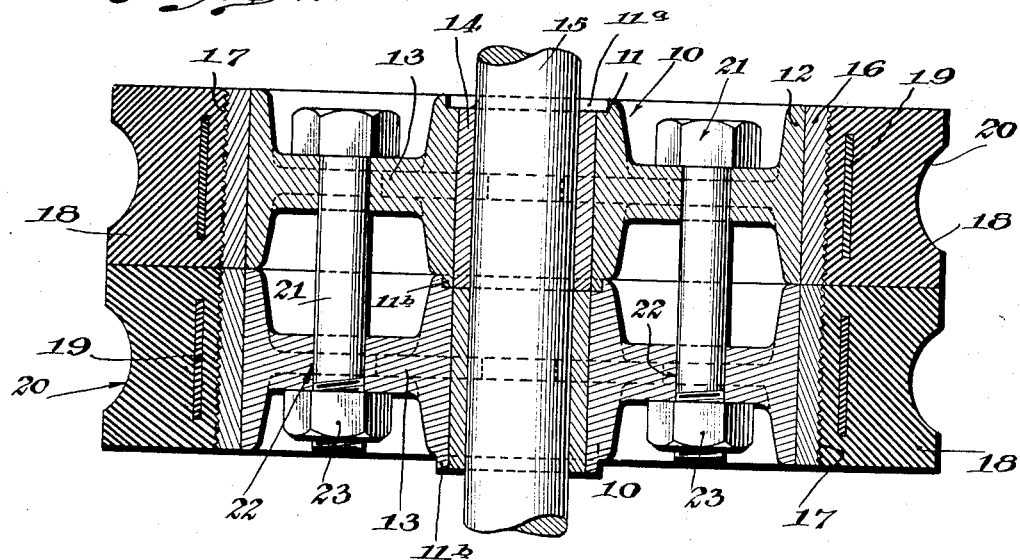
Figure 2 is a cross sectional view of a pair of rollers coupled together to provide a single roller unit.

Occasion may arise where it would be necessary to employ a number of guide pulleys for support of a number of parallel cables, and such condition may be readily accommodated by coupling the desired number of pulleys, as illustrated in Figure 2.

With reference to Figure 2 of the drawing, I have illustrated a pair of pulleys 10 in parallel abutting relation, so as to align the hubs 11. The hubs of the abutting pulleys are arranged so that the rib 11b of one pulley will rest within the annular recess 11a of the next adjacent pulley. Thus the hubs 11 of each wheel will be brought into snug abutting relation and insures proper centering of the bushings, at all times, and especially is this true when the pulleys 10 have any axial movement upon the shaft 15.

Bolts 21 are extended through apertures 22 formed in the web 13 of the wheel, retaining nuts 23 upon the bolts 21 securing the wheels together. Thus, it will be apparent that separate cables may be supported in each of the grooves 20 and that the two pulleys will rotate as a single unit.

Any number of pulleys may be secured in this manner, it only being necessary to employ a longer bolt 21 to accommodate the increased width involved by the addition of pulleys.

From the foregoing, it will be apparent that I have provided a rotary cable support embodying a flexible wear-resisting surface, and have also provided a cable support which may be employed singly or coupled in group formation to accommodate a single or plurality of cables, as the case may be.

While I have shown and described a preferred construction, it will be understood that I do not so limit my invention, and desire it to be understood that modifications thereof may be made, as fairly fall within the scope of the appended claim.

What is claimed is:—

In a guide roller for cable members, axially alined wheels, each wheel having a rim, a rubber facing member secured upon each rim, said facing member having side walls flush with its respective rim, cable-receiving grooves formed in the periphery of said facing members, a hub formed upon each wheel, each hub having an annular recess upon one end and an annular rim upon the other end thereof, a bushing seated in each hub member, said bushing stopping flush with said rim and recess, the rim of one wheel hub adapted to seat in the annular recess of the next adjacent wheel hub, and means for drawing and securing said wheels and facing members into close abutting relationship with each other and said hubs into interfitting relation.

WILLIAM V. CORNISH.